UNITED STATES PATENT OFFICE.

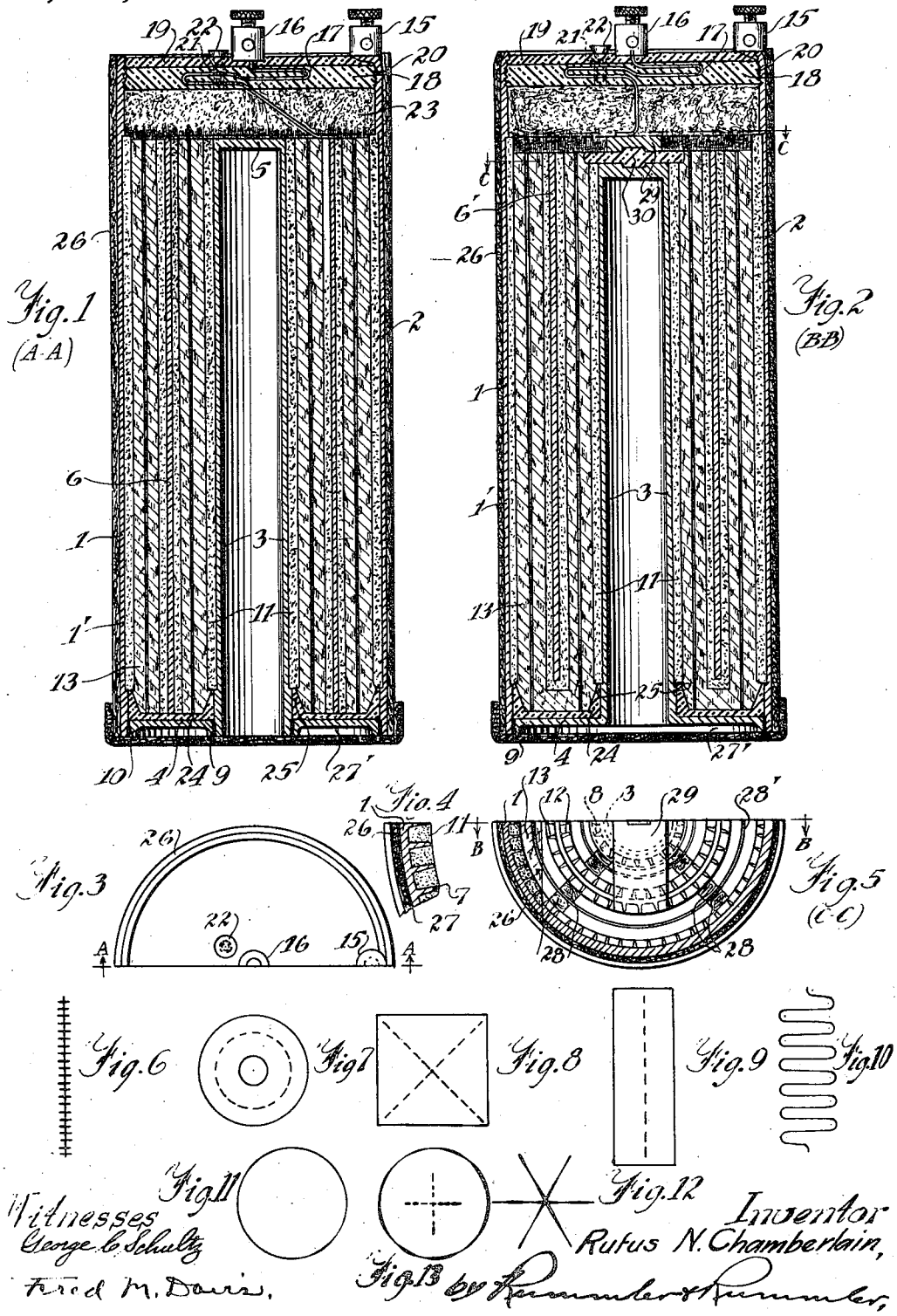

RUFUS N. CHAMBERLAIN, OF CHICAGO, ILLINOIS.

ELECTRIC BATTERY.

1,295,122.   Specification of Letters Patent.   Patented Feb. 25, 1919.

Application filed February 16, 1917. Serial No. 149,027.

*To all whom it may concern:*

Be it known that I, RUFUS N. CHAMBERLAIN, a citizen of the United State of America, and a resident of Chicago, county of Cook, and State of Illinois, have invented certain new and useful Improvements in Electric Batteries, of which the following is a specification.

This invention relates to electric batteries and particularly those which are adapted for recharging.

The main objects of the invention are to provide an improved form of construction and arrangement of the parts of the cell; to provide an improved form of casing adapted to serve as a secondary electrode and adapted for having active material attached to or formed on its inner or electrolytic face; to provide an improved method of making battery jars; to provide a cell casing having means adapted to neutralize leakage; to provide improved means for preventing short-circuits due to sediment collecting in the bottom of the casing or jar member; to provide an improved form of sealing means; to provide an improved form of terminal connection and means for preventing the seepage of electrolyte outwardly thereon through the cover or sealing means; and to provide for making an efficient substantially dry cell adapted for charging and discharging many times successively, and which when worn out or exhausted may, except for the salvage value of the lead, be discarded consistently with commercial efficiency.

What are known commercially as dry batteries have for many years been sold in large quantities, principally because of their cheapness and dryness, but the amount of electrical energy which can be obtained from them is limited to but one complete discharge. On the other hand, batteries which (like the usual storage batteries) when fully charged give considerably more electrical energy for their size and weight, are relatively very expensive and complicated, and because of their free flowing electrolyte are ill adapted to be used for many portable purposes, such as in motor vehicles.

I have invented a battery which for its size and weight gives considerably more electrical energy per complete discharge than a regular dry battery, and yet like the dry battery can be made simply and cheaply but on the contrary can be effectively recharged many times. My improved form of battery thus occupies a field between that of the regular dry battery and that of the storage battery, in that it gives more power for its size and weight than a dry battery, and yet on the other hand is much cheaper and simpler than the usual storage battery. Hence, it is adapted to fill the long felt need and desire for a cheap and strong battery. The usual dry battery is cheap, but relatively weak, while the usual storage battery is strong, but comparatively expensive. Both are subject to serious objections for many purposes. The battery of my invention has the advantages of both the dry battery and storage battery, but neither the electrical weakness of the dry battery nor the expensiveness of the regular storage battery, and it is adapted therefore not only to compete in the commercial field of both the dry and storage batteries, but also to open up many new fields of usefulness which the weakness of the dry battery and expensiveness and complexity of the storage battery have left substantially open.

My invention consists mainly in making a storage battery which has for one of its electrodes, preferably the negative, a metallic container, the inner side of which is coated electro-chemically or otherwise with active material or material adapted to become active, the other electrode being preferably similarly coated with active material and suitably held inside said container. The electrolyte is preferably dilute sulfuric acid rendered non-fluid or non-flowing by suitable means. The cell therefore has some of the general mechanical characteristics of the ordinary dry cell, but owing to its active chemical constituents, has much more power, the working voltage alone being almost twice as great as that of the regular dry cell. The non-flowing electrolyte makes it simpler and easier to use and also safer for portable work, and the simplicity and fewness of the parts makes it far cheaper than the regular storage battery. Another advantage of this improved cell over the ordinary dry battery is that it can be recharged many times to practically its original power, with little cost in time and electric current. The cell is made light and correspondingly little material is used. Hence the weight and cost are not nearly so great as in an ordinary storage battery that is built for severe and high rates of discharge.

Illustrative embodiments of the invention are shown in the accompanying drawings, in which—

Figure 1 is a vertical axial section on the line A—A of Fig. 3, through one embodiment of the invention.

Fig. 2 is a vertical axial section on the line B—B of Fig. 5, through another embodiment of the invention.

Fig. 3 is a half plan of the cell of Fig. 1.

Fig. 4 is an enlargement of part of Fig. 5.

Fig. 5 is a half section on the line C—C of Fig 2.

Fig. 6 is a conventional plan diagram of another form of positive electrode.

Figs. 7, 8 and 9 are conventional plan diagrams of three forms of containers or negative electrodes, and the positive electrodes being indicated by dotted lines.

Figs. 10, 11 and 12 are conventional plan diagrams of three forms of positive electrodes.

Fig. 13 shows a cylindrical negative and a cross shaped positive electrode.

In the embodiment shown in Fig. 1, the container or negative electrode 1 is of suitable metal, as lead, preferably rolled, as rolled lead is free from blowholes and is less liable to leak. The shape is preferably cylindrical as shown at 1 in Figs. 1 and 5. The active material 2 is preferably produced by electro-chemical formation, which is not only of comparatively small cost, but forming it in this way insures that the active material is in intimate electrical contact with the unformed lead which acts as a conductor as well as container. If preferred, the active material or material adapted to become active can be applied mechanically.

In order that the metal may be disposed most efficiently for a given weight the container electrode is provided with an inner wall part 3 connected to the outer wall part or container proper by the bottom 4. The inner part 3 is closed at the top by wall 5. By this form of casing there is provided a narrow cylindrical chamber adapted to receive the positive element 6 in closely spaced relation to the complementary negative element on each side.

The preferred method of forming or shaping the container is as follows: The cylindrical outer wall member 1' is drawn in tubular form, with corrugations or ribs 7 extending longitudinally on its inner surface. The inner part 3 of the container is also preferably formed in a similar manner, with the ribs or corrugations 8 disposed on its convex surface. The bottom member 4 is annulus-shaped and is preferably provided with downwardly turned flanges 9 and 10 on its inner and outer edges adapted to facilitate burning or soldering to the lower ends of the inner and outer wall members. In forming the active material, the forming current is kept on until the ribs and inner part of the walls are in large measure converted to active material, leaving only a comparatively thin shell or supporting part of metallic lead. The ribs are spaced and proportioned with respect to the thickness of the wall, so that when the forming process is completed, the space between the ribs is substantially filled with active material, and only sufficient metallic lead is left to constitute a sufficient support and protection to the active material and electrolyte.

The positive electrode 6 consists of a suitable lead structure of cylindrical shape in the form shown, though it can take other forms as will be explained. The active material 11 on the positive electrode is preferably formed on the lead grid by a Planté or electro-chemical process, though it or material adapted to become active may be also applied mechanically. The positive element 6 may be shaped by a drawing process as above mentioned. It is provided preferably with longitudinal ribs 12 on each side, inner and outer.

The electrolyte 13 is preferably a proper grade of sawdust and pumice stone or the like soaked with a solution of about 1.200 sp. gr. sulfuric acid, or it may be in a gelatinous form produced by the addition of sodium silicate to a solution of sulfuric acid of the density mentioned. By using electrolyte absorbed by sawdust, pumice stone, powdered charcoal or similar non-active absorbent 14, the cell becomes practically a dry cell. When the gelatinous electrolyte is used, it is made too thick to flow through any vent or hole in the cell, and the result is in effect substantially a "dry" cell.

The negative terminal 15 is preferably attached to the top edge of the container or negative electrode 1. This terminal being negative has little chance or tendency to corrode.

The positive terminal 16 has a long and bent conducting strip 17 of lead so as to provide a great length of sealing surface in the compound 18 with which it is surrounded so as to avoid the electrolyte leaking out, as the electrolyte has a tendency to creep on the surface of lead. Short terminals usually show wet electrolyte on their surface unless prevented by abundant sealing or very long protruding terminals. Long upright terminals take too much overhead room in small batteries. The method I use of embedding a long bent terminal connection not only gives the effect of a long upright terminal, but also affords several times the sealing surface. Loose or wet electrolyte on the exterior of a battery, especially a portable battery, is very deleterious to objects touching it as well as troublesome in making bad contacts at the terminal because of corrosion.

The sealing compound 18, which is preferably an asphaltum material, is yielding but is of great adhesiveness. Above this more elastic and adhesive sealing compound there is provided a hard asphaltum material or wax 19. This double sealing while advantageous is not necessary and either a hard or soft, or medium sealing material can be used if preferred in any instance.

In order to provide a tight and effective joint surface for the sealing compound the inner surface of the lead container at the top is roughened, creased, or grooved at 20.

A vent port 21 is provided to allow the escape of whatever gas may be formed and needs freeing, especially in charging and also to permit the addition of whatever amount of water and electrolyte may be required from time to time.

When the cell is in service there is little if any gas given off, and therefore a plug 22 is provided which, when the pressure of gas becomes sufficient is simply raised until the gas escapes. Said plug has a tapered form so that a little raising releases the gas when the plug can then drop back in place.

In order to absorb any surplus of free or flowing electrolyte that may sometimes exist in the cell, a layer of comparatively dry sawdust is placed as shown at 23. The lower part is shaded somewhat dark to represent some free acid that has been absorbed, while the upper shading indicates the comparatively dry sawdust which thus is ready to absorb any additional free electrolyte should the cell become inverted.

The positive electrode is supported as well as insulated by the preferably cup-shaped insulator 24, at the bottom of the container or negative electrode 1. This insulator being cup-shaped not only insulates the positive electrode from the negative, but insulates any sediment which may be deposited at the bottom in the course of time. The insulator can be made of rubber, porcelain, celluloid, wood, or any other suitable material. It may also be formed by melting asphaltum in the bottom of the container, and when cooling forming it into the cup or saucer shape shown. The shape of the cup 24 is annulus like with upstanding flanges 25.

In order to protect the thin lead shell or wall 1', as well as insulate it, the lead container is incased in a cardboard cup or shell 26, or other suitable cover that protects and insulates. Paint can be used such as thick asphaltum compositions, if preferred, in place of the cardboard carton.

In order to guard against harm arising from a break or perforation occurring in the container walls whereby some of the electrolyte might leak out, as for instance in the case of a flaw in the thin metal wall, a coating 27 of a neutralizing agent is provided between the container wall and the cardboard casing, alkali being preferred. The alkali may be applied in the form of a paste or paint, either to the container or to the cardboard, the effect being that should the electrolyte leak through the container and come in contact with the alkali, the acid will be neutralized, and the reaction will produce a salt which may incidentally seal the leak. In order to more effectively guard against harm, the space 27' at the bottom of the cell between the lead and the cardboard is filled with a more substantial layer or coating of alkali than is represented by the coating on the upper part.

A coating of "acid proof" paint may to advantage be applied to the inside of the container at and adjacent to the top where the sealing material is to be subsequently applied. Such a coating assures a good contact between the sealing material and the lead casing.

Alining means or separators are provided to hold the positive element in its due medial position between the inner and outer walls of the container. For this purpose a plurality of long narrow strips 28 are disposed vertically in distributed relation, preferably between the outer container wall 1' and the positive electrode 6, as illustrated in Fig. 5. Said strips may be of hard rubber but wood is preferred because highly efficient and cheaper than rubber. Thin porous veneer sheets 28' may also be placed between the electrodes if desired to prevent the electrodes from touching each other and to prevent particles of active material dislodging from either or both of the electrodes and causing grounds or short circuits.

In the embodiment shown in Fig. 2, the positive element 6' is cylindrical and resembles the corresponding element 6 in Fig. 1 except that it is suspended from the top instead of resting on the insulator 24. For this purpose a strap or bar 29 of lead is attached across the top of the electrode 6', and said bar rests across the upper end of the inner part or core of the container, being insulated therefrom by a block 30 of suitable insulating material, such as glass. This form while somewhat more expensive to make is less likely to be short-circuited in any degree by active material collecting on the insulator 24.

While the embodiments of Figs. 1 and 2 represent forms which are considered preferable, the invention is capable of practical embodiment in numerous other forms illustrated and suggested by the conventional diagrams of Figs. 6 to 12 inclusive.

The above described forms of container and positive electrode have advantages over the usual forms of electrodes used in storage batteries, even when the absorbent material is omitted, and the cell is used as a wet battery. Where portability is not required the wet type may well be used, in which case the seal is preferably replaced by a hard rubber or glass cover which may be fitted to the container and provided with a suitable vent, as understood in the art.

Although certain forms of embodiment of this invention are herein shown and described it is to be understood that numerous details of the constructions shown may be altered or omitted without departing from the spirit of this invention as defined by the following claims.

I claim:

1. A battery, comprising a light thin walled container provided with active material of negative character on its inside face, said container serving as the negative electrode.

2. A battery, comprising a container having its top sealed and provided with a vent in the sealing material, an electrolyte normally in substantially non-flowing condition in said container, and absorbent material in absorbent condition disposed immediately between said sealing material and electrolyte to prevent any electrolyte from escaping through the vent.

3. A battery having a container and sealing means therefor, an electrode contained therein, electrolyte surrounding said electrode, and a terminal strap or connection extending through the sealing means and electrolyte and communicating with said electrode and being of bent or tortuous form where embedded in the sealing means whereby its bond with the sealing material is of greater length than the thickness of the sealing material.

4. In a battery, a unitary container of substantially integral character comprising a pair of concentric cylindrical walls in spaced relation.

5. In a battery, a container comprising a pair of concentric cylindrical walls in spaced relation, and a bottom member of annulus shape connecting said wall members.

6. In a battery, a thin walled container having a cylindrical chamber of annular shape, and comprising a pair of concentric inclosure walls in spaced relation, a bottom member therefor, and a cylindrical electrode disposed in said chamber between said walls.

7. In a battery, a casing comprising a pair of concentric cylindrical walls, an annulus shaped bottom fixed to and connecting said walls, said bottom having depending flanges on its inner and outer edges disposed against the corresponding walls.

8. A battery, comprising a container, a covering therefor, and a neutralizing agent disposed between said container and covering for rendering harmless any electrolyte escaping from said container.

9. A battery, comprising a container arranged to serve as an electrode, electrolyte in said container, a covering for said container, and an alkali disposed between said container and covering adapted to neutralize any electrolyte leaking through the wall of said container.

10. The method of forming a battery container, which consists in providing a wall member applying alkali to the exterior thereof and covering the same with a protective member.

11. A rechargeable dry cell, comprising a pair of electrodes disposed one within the other, the outer electrode being formed and adapted to serve as a casing, a closure for said casing, means for sealing the closure, terminals for said electrodes, the connection for the inner electrode terminal being arranged sinuously and embedded in the sealing means.

Signed at Chicago this 13th day of Feby., 1917.

RUFUS N. CHAMBERLAIN.